United States Patent
Balchunas et al.

[11] 3,789,295
[45] Jan. 29, 1974

[54] METHODS OF AND APPARATUS FOR DETECTING, CLASSIFYING AND LOCATING INSULATION FAULTS IN INSULATED ELONGATED CONDUCTORS

[75] Inventors: William Clement Balchunas; Jose Antonio Mila, both of Atlanta, Ga.

[73] Assignee: Western Electric Company, Incorporated, New York, N.Y.

[22] Filed: Apr. 2, 1973

[21] Appl. No.: 347,037

[52] U.S. Cl. .................................. 324/54, 324/52
[51] Int. Cl. ...................... G01r 31/08, G01r 31/12
[58] Field of Search ............................... 324/52, 54

[56] References Cited
UNITED STATES PATENTS

| | | | |
|---|---|---|---|
| 1,938,684 | 12/1933 | Bond et al. | 324/54 |
| 2,894,204 | 7/1959 | Gambrill | 324/54 |
| 2,994,820 | 8/1961 | Brown | 324/54 |
| 3,217,246 | 11/1965 | Kallet et al. | 324/54 |
| 3,323,701 | 6/1967 | Gurski et al. | 324/54 X |
| 3,411,078 | 11/1968 | Hartman | 324/54 |
| 3,418,570 | 12/1968 | Clinton | 324/54 |
| 3,491,290 | 1/1970 | Peschel | 324/54 |
| 3,548,302 | 12/1970 | Arnold et al. | 324/54 |
| 3,628,133 | 12/1971 | Dornberger | 324/52 |

*Primary Examiner*—Gerard R. Strecker
*Attorney, Agent, or Firm*—J. M. Revesz

[57] ABSTRACT

One or a twisted pair of grounded insulated wires are advanced longitudinally past a high voltage electrode maintained at a potential difference with respect to a wire sufficient to produce an arc discharge at a point on the wire containing an insulation fault. The arc discharge is translated to a logic level utilized to trigger a logic circuit discriminator which renders an output gated to identify the fault as a major or minor insulation fault, by comparing a preset number, representing a pulse count scaled to the length of the electrode traversed by the wire plus an arbitrarily determined amount related to the longitudinal extend of the fault, to the total number of pulses similarly scaled, representing the length of wire advanced past the electrode during the period of the arc discharge. If the length of wire advanced past the electrode during the arc discharge therein exceeds the preset length, the fault is identified as major, for example a bare wire or insulation split. Otherwise, the fault is identified as minor, for example, a pinhole. Electrical signals representing minor faults in excess of a predetermined permissible amount or a major fault may be utilized to indicate unacceptable insulated wire and, when utilized with a rewinder apparatus, may operate a control circuit therefor to slow down, stop and reverse the direction of the movement of the wire, and to trigger a fault location counter. The location counter counts up from zero until the direction of the wire is reversed, at which time it counts down to stop the reverse advance of the wire when the count again reaches zero, or a predetermined number, automatically to return the fault to the electrode or a predetermined distance therefrom where it can then be repaired or be removed from the wire.

15 Claims, 2 Drawing Figures

METHODS OF AND APPARATUS FOR DETECTING, CLASSIFYING AND LOCATING INSULATION FAULTS IN INSULATED ELONGATED CONDUCTORS

BACKGROUND OF THE INVENTION

1. Field of the Invention

The present invention relates to methods of and apparatus for testing the continuity of insulation on insulated elongated conductors and, more particularly, to methods of and apparatus for detecting, classifying and locating insulation faults in insulated elongated conductors, for example, insulted wires.

2. Technical Considerations and Prior Art

In the manufacture of communications wire and cable, wires are insulated and twisted into pairs, and the twisted wire pairs are then stranded into cable cores. Because of the difficulty in repairing defective wire, for example, wire containing defects or faults in the insulation when the wire is part of a stranded cable core, every effort is made to detect and repair these faults during or immediately after the insulating and/or the twisting process.

It is common practice to detect insulation faults in insulated wires by advancing an insulated wire past a high voltage electrode or probe maintained at a relatively high electrical potential with respect to the wire, which is usually grounded, in order to produce an arc discharge between the electrode and the wire at a faulty, or dielectrically weak, section of the insulation thereon. This discharge is then utilized to trigger a counter to count the number of faults in the wire insulation and could be further utilized to stop the advance of the wire to permit visual inspection and repair of the fault.

Because many detection methods are "in line," that is, operating during the actual insulation or twisting process, much time may be lost in stopping the process to facilitate repair of the insulation on the wire. Moreover, it has been determined that cable acceptable for communications purposes may be produced even though the individual insulated wires comprising the cable contain a limited number of minor insulation faults. For example, acceptable communications cable may be made with insulated wires which contain an average of no more than twenty pinhole faults in a 26,000 foot length.

For practical reasons, therefore, it is common practice merely to detect the insulation faults in each manufactured unit, for example, a reel length of insulated or twisted wire, and, based upon the length of wire and the allowable number of faults therein, indicate that the wire on a reel contains excessive faults and is a defective reel. These reels are thereafter shipped to a repair facility wherein the faults are detected again by a similar apparatus which may additionally advance the wire past a fault detecting electrode and stop the advance of the wire at each fault in order to facilitate the repair or removal thereof.

Although a limited number of minor insulation faults are tolerable in insulated wires utilized in communications cable, major insulation faults such as totally bare sections of wire and longitudinal cracks or splits in the insulation are intolerable. There is, therefore, a need to differentiate between these faults, that is, there is a need to classify them in order to make a meaningful decision in identifying what is and what is not defective wire. For the purpose of differentiation, it is necessary merely to distinguish minor faults from major faults. Generally, bubbles and pinholes in the insulation may be classified as minor faults while bare wire sections and split insulation may be classified as major faults. Additionally, minor faults in excess of a predetermined allowable number may be designated as a major fault which must be corrected to provide insulated wires acceptable for use in communications cable.

One prior art method of detecting insulation faults in insulated wires is taught in R. D. Gambrill U.S. Pat. No. 2,894,204, wherein minor faults, such as pinholes, generate a single electrical pulse which is registered as a single count in a counter. On the other hand, major faults, such as insulation splits or bare wires generate a series of pulses which are registered as a plurality of counts in the same counter. Whether a single pulse or a series of pulses are generated is dependent upon a time delay relay which is energized by a fault current which passes from a coaxial high voltage electrode through the fault and the wire. The time delay of the relay must be selected to coincide with the line speed in order to provide different responses of the system to major and minor faults.

The series of pulses representing a major fault are generated by a tachometer-type pulse generator synchronized with the line speed. However, since all of the generated pulses are counted on a single counter, an operator must observe the counter constantly to determine whether or not an intolerable number of minor faults or a major fault is present in the wire. Otherwise, a count of 10, for example, might mean 10 pinholes in several thousand feet of wire or a single bare wire section, the former being tolerable, while the latter is not. Additionally, it must be assumed that the arc discharge in the electrode is constant when it is, in fact, intermittent.

Another prior art system for detecting insulation faults is disclosed in A. Arnold et al U.S. Pat. No. 3,548,302, wherein a rotatable pulley-type high voltage electrode is utilized to generate one or, because of the intermittent nature of arc discharges, a series of fault current pulses through an insulated wire under test, which are counted to identify and differentiate between two types of major faults such as excessive pinholes or bare wires, respectively, in the wire insulation. Separate indicating means, for example, lamps, are provided to indicate the character of the major faults detected. Once again the ability of the system to differentiate between different types of insulation faults is dependent upon the timing of the system which must be selected according to the line speed. Furthermore, the pulley-type electrode utilized in Arnold is unsuitable for detecting insulation faults in insulated twisted wire pairs.

Among other things, neither of the foregoing systems provides for fluctuations in line speed, both assuming that a constant predetermined line speed is present. It would be an advantage, therefore, to provide a high voltage method of and an apparatus for accurately detecting and classifying insulation faults in either single or twisted pairs of insulated wires which provides for fluctuations in line speed and is not affected by the fact that the arc discharge may be intermittent. Such a method and apparatus may be utilized in conjunction with a wire insulating apparatus or a wire twisting apparatus to identify defective reel lengths of single or twisted pairs of insulated wires, respectively.

Additionally, such a method would be of advantage in detecting and locating insulation faults in a repair facility, commonly referred to in the art as a "rewinder" or a "respooler." Such systems are well known in the art and are discussed, among other places, in A. E. Hartman U.S. Pat. No. 3,411,078 and G. C. Dornberger U.S. Pat. No. 3,628,133, which describes a method of and apparatus for locating open sections of insulated filamentary conductors in order to facilitate the repair thereof.

Typically, a fault detecting and locating system associated with a rewinder monitors the insulated wire or wires as they are advanced past a detecting electrode or probe at high speed, whereupon a detected fault causes stoppage and reversal of the advance of the wire at a substantially slower speed, until a fault is once again detected, at which time the reverse advance of the wire is stopped with a fault located somewhere in the vicinity of the probe. There is, however, no assurance that the located fault is the one which initiated the stoppage and reversal of the apparatus, since one or more additional faults may have passed the probe after the original fault was detected. Thus, the initially detected fault may escape repair or removal unless the entire length of insulated wire is run through the apparatus one or more additional times.

It would be an advantage to have a method and apparatus associated with a repair facility which could locate a detected insulation fault accurately such that no faults are overlooked, and all major faults can be located and repaired to provide an insulated wire having acceptably fault-free insulation thereon.

SUMMARY OF THE INVENTION

One object of the present invention is to provide new and improved methods of and apparatus for detecting and classifying major and minor insulation faults in insulated elongated conductors, which are not affected by fluctuations in line speed.

Another object of the present invention is to provide a new and improved method of and apparatus for locating detected major insulation faults in insulated elongated conductors in order to permit the repair on the removal thereof.

A method of detecting and classifying major and minor insulation faults in an insulated, elongated conductor advancing longitudinally past an electrode, wherein a sufficient electrical potential is provided between the conductor and the electrode to cause an arc discharge therebetween at an insulation fault on the conductor, in accordance with the present invention, may include the steps of detecting an arc discharge occurring when a fault is adjacent to the electrode, generating a quantity proportional to the length of conductor advanced past the electrode since the initiation of the arc discharge, diminishing a fixed quantity, proportional to the length of the electrode traversed by the advancing conductor by an amount equal to the generated quantity, identifying the fault as major if the arc discharge has not terminated when the fixed quantity has been diminished to zero and identifying the fault as minor if the arc discharge has terminated when the fixed quantity has been diminished to zero.

An apparatus for detecting and classifying major and minor insulation faults in an insulted elongated conductor advancing longitudinally past an electrode, wherein a sufficient electrical potential is provided between the conductor and the electrode to cause an arc discharge therebetween at an insulation fault on the conductor, in accordance with the present invention, may include means for detecting an arc discharge occurring when a fault is adjacent to the electrode, means for generating a quantity proportional to the length of conductor advanced past the electrode since the initiation of the arc discharge, means for diminishing a fixed quantity, proportional to the length of the electrode traversed by the advancing conductor by an amount equal to the generated quantity, and means for identifying the fault as major if the arc discharge has not terminated when the fixed quantity has been diminished to zero and for identifying the fault as minor if the arc discharge has terminated when the fixed quantity has been diminished to zero.

BRIEF DESCRIPTION OF DRAWINGS

A more comprehensive understanding of the invention may be obtained from the following detailed description of a preferred embodiment thereof, when read in conjunction with the accompanying drawings, wherein.

DETAILED DESCRIPTION

1. General Description of the Apparatus

Figure 1:
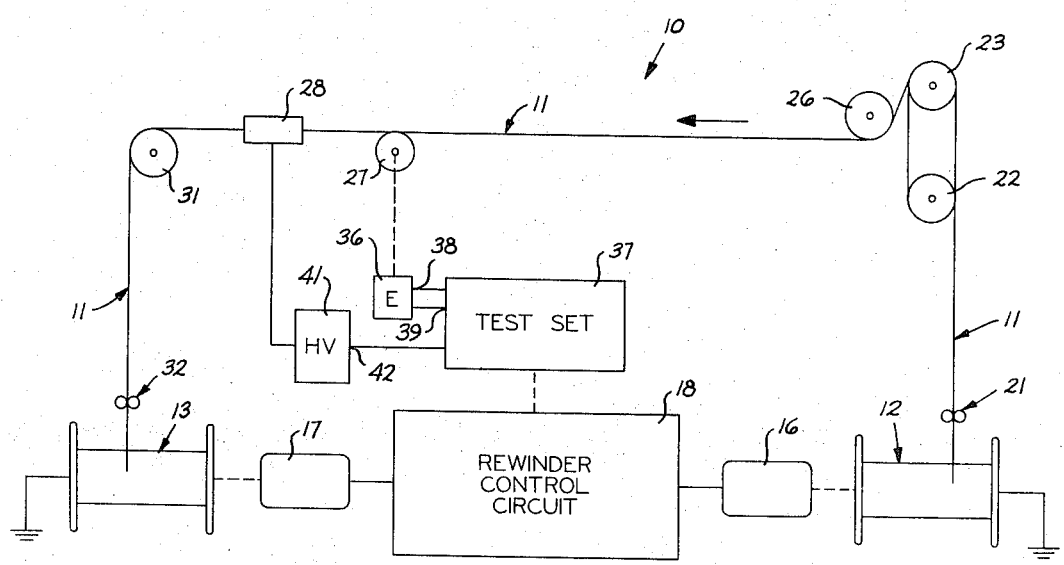
FIG. 1 is a schematic diagram, in block form, of a rewind repair apparatus for detecting, classifying and locating insulation faults in insulated elongated conductors.

Referring to FIG. 1, there is illustrated schematically a rewinder apparatus, generally indicated at 10, which has been modified to detect, classify and locate insulation faults in one or a twisted pair of insulated elongated conductors or wires 11.

The wire insulation may be of plastic material, for example, polyethylene. The basic rewinder apparatus may be of the type commercially manufactured by the Davis Electric Company of Wallingford, Connecticut, and includes a driven supply reel 12 having wound thereon a supply of the insulated wire 11, containing repairable insulation faults therein and a driven take-up reel 13, for taking up the wire 11.

The driving means for the reels 12 and 13 may include first and second drive motors 16 and 17, respectively, controlled by a rewinder control system 18, for driving each reel reversibly at controlled speeds and for selectively slowing down, stopping and imparting an emergency stop to each drive motor.

The insulated wire 11 is advanced from the driven supply reel 12 through a pair of guide rollers 21, forming part of a traversing distributor mechanism (not shown) around a pair of accumulator sheaves 22 and 23, beneath a guide sheave 26, over a measuring sheave 27, past a high voltage electrode 28, around a guide sheave 31, through a second pair of guide rollers 32, forming part of a second traversing distributor mechanism (also not shown) and is taken up on the driven take-up reel 13.

The measuring sheave 27 is coupled to an encoder 36, which may be an optical incremental encoder of the type commercially manufactured by the Norden Components Division of the United Aircraft Corporation, of Norwalk, Conn., which produces a pair of phase-shifted pulse trains indicative of the length of wire 11 advanced longitudinally over and driving the measuring sheave 27 in the direction, forward or reverse, in which the wire 11 is traveling.

Throughout this description, the forward, or direction of advance of the wire 11, will refer to the advance of the wire from the supply reel 12 to the take-up reel 13, as indicated by the arrow, and the counter-advance or reverse direction of the wire 11 will refer to the advance of the wire from the take-up reel 13 to the supply reel 12. It will be noted that in the counter-advancing or reverse direction of the wire, the reel 13 becomes the supply reel while the reel 12 becomes the take-up reel. However, to avoid confusion and to keep terminology consistent, the reel 12 will always be referred to as the supply reel and the reel 13 will always be referred to as the take-up reel, regardless of the direction of longitudinal movement of the wire 11.

The encoder 36 is connected electrically to a test set 37, which is the subject of the present invention, through a pair of output lines 38 and 39. The test set 37 additionally receives the output of a high voltage supply and detection circuit 41, coupled to the electrode 28, whenever an insulation fault in the insulated wire 11 passes through the electrode 28 producing an arc discharge therein which is detected in the high voltage circuit 41 as a fault current to ground through the conductive portion of the insulated wire 11. The wire 11 is preferably connected directly to the take-up reel 13, which is grounded. The electrode 28 is maintained at a high direct voltage to ground, for example, 15 KV, by the high voltage circuit 41, which is connected to the test set 37 by an output line 42 which goes high or produces a binary 1 in terms of positive logic each time an arc discharge occurs between the electrode 28 and the wire 11.

The probe 28 and the high voltage circuit 41 may be of the type commercially manufactured by D.C.M. Industries, Inc., of San Leandro, Calif., and may be of a cylindrical construction and filled with hollow steel balls to strengthen the electric field therein and center the advancing wire.

In operation generally, the wire 11 may be advanced in the forward direction from the supply reel 12 to the take-up reel 13, at a suitable speed, for example, 4000 feet per minute, rotatably driving the measuring sheave 27 counterclockwise. As the insulated wire 11 is advanced through the electrode 28, a dielectrically weak area in the insulation on the wire 11, for example, a pinhole, a bare section of wire, a split in the insulation, or thin insulation, will cause an arc discharge between the electrode 28 and the wire 11 whenever the weak area of the insulation is adjacent to the electrode 28.

It will be noted that, as taught in R. D. Gambrill U.S. Pat. No. 2,894,204, a major fault, such as a bare wire or a split in the insulation, will produce an arc discharge in the electrode 28 for a longer period of time than a longitudinally shorter fault such as a pinhole. Thus, if the length of wire 11 passed through the electrode 28 during the occurrence of the arc discharge therein is compared to the effective length of the electrode 28, a determination may be made of whether the fault is a major fault or a minor fault.

If an arc discharge occurs in the electrode 28 when a length of wire exceeding the effective length of the electrode 28 by more than an arbitrarily determined amount, for example, 0.5 inches, the fault may be classified as a major fault which would require terminating the advance of the wire 11, that is, stopping the apparatus 10 and repairing the fault before continuing the advance of the wire 11 onto the take-up reel 13. If the arc discharge occurs over a shorter length, the fault may be classified as minor. However, should an arbitrarily determined number of minor faults occur in the wire 11, for example, 20 pinholes in 26,000 feet of wire, the 20th pinhole may be classified as a major fault which must be repaired if the wire is to be of acceptable quality.

The types of insulation faults of concern in testing insulation continuity are pinholes, bubbles, bare wire sections, split insulation and thin insulation. Whether they are major or minor is determined by the longitudinal extent thereof over the wire 11. If a fault is less than, for example, one-half inch long, it may be considered a minor fault. Similarly, faults over one-half inch long may be considered major faults. For the remainder of the description, for simplicity, a minor fault of any type will be referred to as a pinhole, with a predetermined number thereof in a measured length of wire being considered a major fault, and a major fault of any type will be referred to as a bare wire.

Thus, as the wire 11 is advanced past the electrode 28, each insulation fault will be detected and classified as a pinhole or a bare wire. If the fault is classified as a pinhole, in most instances it will merely be registered during the passage of a predetermined length of the wire 11 until the number of registered pinholes exceeds a predetermined allowable number thereof which is preset into the test set 37. A bare wire section advancing past the electrode 28 will be detected and classified as a bare wire.

Pinholes in excess of the allowable number over a predetermined length of the wire 11 and bare wires cause a relay 43 (FIG. 2) in the test set 37 to operate a sequencing circuit (not shown) in the control circuit 18 to slow down, stop and reverse the advance of the wire 11 to return the first excessive pinhole or the bare wire, which may have advanced a considerable distance past the electrode 28, to the vicinity of the electrode 28 where the advance of the wire 11 is stopped, whereupon it may be visually inspected by an operator who will then repair or remove the detected fault.

While the electrode 28 is shown and described as being a tubular coaxial electrode with respect to the wire 11, it may have various physical configurations, the only criterion being that it have a determinable effective length subtended by the wire 11. For example, if the electrode 28 is in the form of one or a pair of rectangular plates and the wire 11 subtends a diagonal of the plates, the effective length of the electrode will be based upon the length of the diagonal.

The effective length of the electrode 28 may be, but is not necessarily, the physical length thereof subtended by the wire 11. For example, as shown in FIG. 1, if the wire 11 is advanced coaxially through a tubular electrode, the physical length of the electrode subtended by the wire 11 will be equal to the axial length of the electrode. Because of the fringing characteristics exhibited by the electrostatic field between the wire 11 and the electrode 28 at the edges thereof, an arc discharge will occur between the electrode and a fault in the wire insulation a short distance before the wire 11 is passed into the electrode 28. Similarly, the arc discharge will continue for a short distance after the fault is passed out of the electrode 28.

2. Description and Operation of the Test Set

Figure 2:
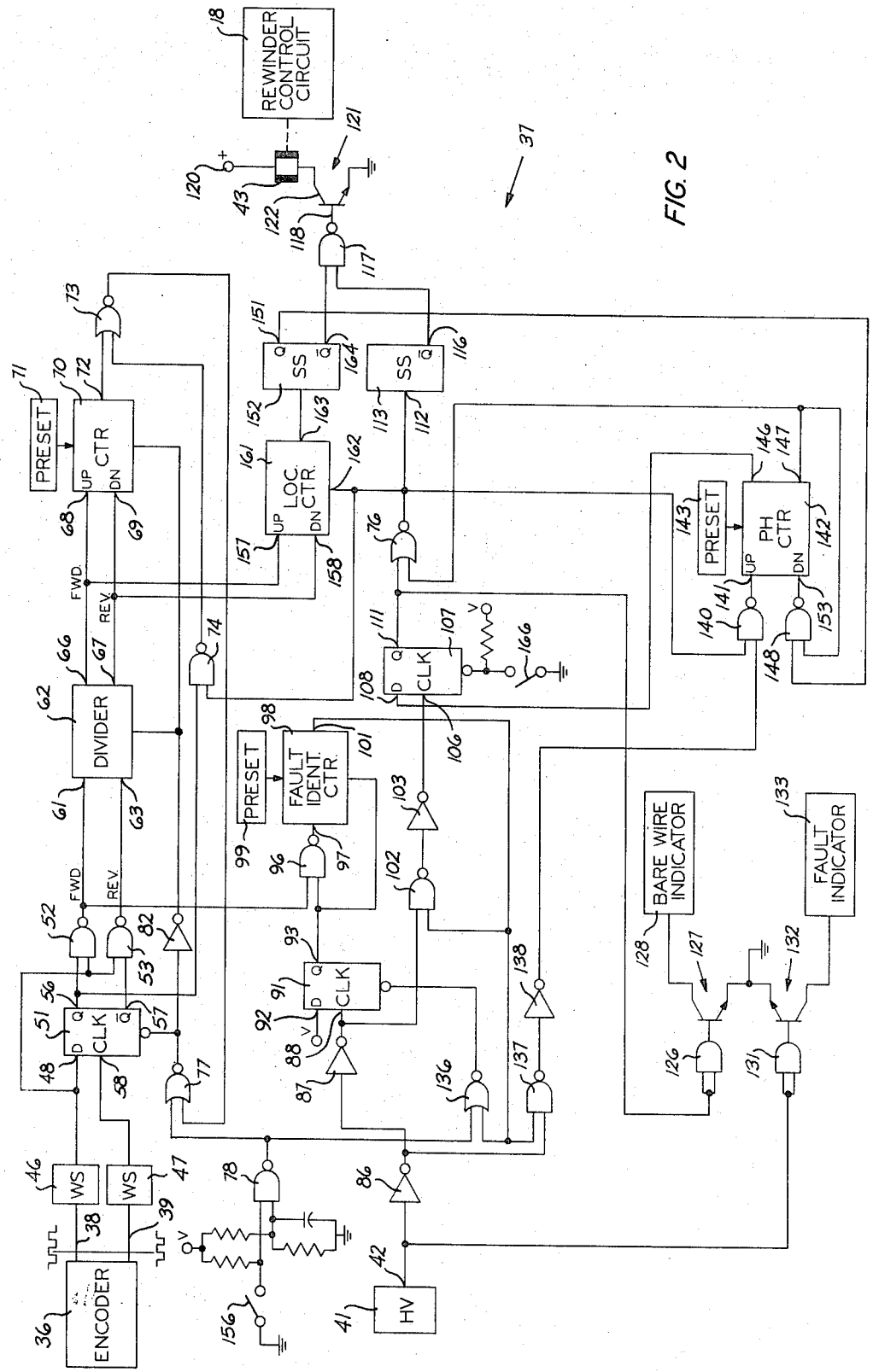
FIG. 2 represents a more detailed schematic diagram of a test set control system associated with the apparatus of FIG. 1.

FIG. 2 shows a detailed schematic illustration of the test set 37. In terms of positive logic a "high" will mean a binary 1 and a "low" will mean a binary 0 whenever reference to a logic voltage level is made.

Referring to FIG. 2, as previously mentioned, the encoder 36 has two outputs 38 and 39, each output having impressed thereon 512 pulses for each revolution of the measuring sheave 27. The circumference of the sheave 27 is precisely known and may be, for example, 2 feet. Thus the encoder 36 will generate 512 pulses on both outputs 38 and 39 for every two feet of the wire 11 advanced over the sheave 27. The phase relationship between the pulses on the outputs 38 and 39 of the encoder 36 are indicative of the direction of advance of the wire 11. If the pulses on the output 38 of the encoder 36 lead the pulses on the output 39 by 90°, that is indicative of an advance of the wire 11 in the forward direction from the supply reel 12 to the take-up reel 13. If the advance of the wire 11 is reversed such that the wire 11 travels from the take-up reel 13 to the supply reel 12, the pulses on the output 39 of the encoder 36 will lead the pulses on the output 38 thereof by 90°.

The outputs 38 and 39 of the encoder 36 are connected respectively to first and second wave shaping circuits 46 and 47, which may be integrated circuit-type Schmitt triggers. Their purpose is to reshape the encoder pulses which may become distorted if long wires are used to connect the encoder 36 to the test set 37. The output of the wave shaper 46 is fed simultaneously to the D input 48 of a D-type flip-flop 51 and a first input of each of a pair of NAND gates 52 and 53, each having a second input connected respectively to the Q and $\bar{Q}$ outputs 56 and 57 of the flip-flop 51. A clock input 58 of the flip-flop 51 is connected to the output of the circuit 47.

In the forward direction, the pulses arriving at the clock input 58 of the flip-flop 51 lag the pulses arriving at the input 48 thereof. After each positive transistion of a pulse appearing at the input 58 of flip-flop 51, a high appears at the input 48 thereof, causing the output 56 thereof to be high and the output 57 to be low. Therefore, the flip-flop 51 is always in a "set" state when the wire 11 is advancing in the forward direction from the supply reel 12 to the take-up reel 13. In this state, the low on the output 57 of the flip-flop 51 keeps the output of the NAND gate 53 high. The output of the NAND gate 52, however, switches at the same rate as the pulses from the wave shaper 46.

Thus, in the forward direction, 512 pulses per revolution of the measuring sheave 27 appear at a first input 61 of a divider 62, while a constant d.c. voltage level appears at a second input 63 of the divider 62.

The divider 62 divides the incoming pulses by 256 to render one pulse per foot on an output 66 thereof when the wire 11 is advancing in the forward direction. Conversely, a second output 67 of the counter 62 is maintained at a constant d.c. level for as long as the wire 11 is moving in the forward direction. The divider 62 may comprise a pair of serially connected dividers, each of which renders an output pulse for each 16th input pulse received thereby.

The outputs 66 and 67 of the divider 62 are coupled to the inputs 68 and 69 of an up-down footage counter 70 having a display, for example, an arrangement of light-emitting diodes associated with each stage thereof. The counter 68 may be a five-stage decade counter and may be preset by any suitable presetting means 71, for example, thumbwheel switches and comparators, to cause a normally high output 72 thereof to go low when the displayed count reaches the number preset therein. If a five-stage decade counter is used, it may have the output of each of the four lowest decades coupled to the input of an associated comparator which may be preset by a thumbwheel switch to preset a count of 2,000 therein, changing the output 72 each time 2,000 feet of the wire 11 has advanced over the measuring sheave 27 and thus past the electrode 28.

The output 72 of the footage counter 70 is connected to a first input of a NOR gate 73 having a second input thereof coupled to the output of a NAND gate 74. The NAND gate 74 has a first input connected to the output 56 of the flip-flop 51. A second input of the NAND gate 74 is coupled to the output of a NOR gate 76 which is normally high but goes low every time a major fault occurs in the insulation of the section of the wire 11 passing through the electrode 28, as will be explained below. In the forward direction of the wire 11 the output of NAND gate 74 is held low by the high output 56 of the flip-flop 51 if no major faults have occurred.

The output of the NOR gate 73 is connected to a first input of a NOR gate 77 having a second input connected to the normally low output of a reset NAND gate 78. The output of the NOR gate 77, therefore, is normally high but goes low each time a high appears at the output of the NOR gate 73. When the counter 70 reaches the preset footage count set therein, the output 72 thereof goes high causing the output of NOR gate 73 to go high. This causes the output of NOR gate 77 to go low to reset the flip-flop 51 and to reset the divider 62 and the counter 70 through an inverter 82. Thus, after the passage of the preset footage of wire 11 through the electrode 28, the footage counter 70 is reset to zero and starts to count again up to the preset number. This will enable an operator to keep a record of the number of insulation faults occurring in a predetermined length of the insulated wire 11.

As the insulated wire 11 advances past the electrode 28, a fault in the insulation causes an arc discharge between the electrode 28 and the wire 11. This arc discharge is detected by the high voltage circuit 41, the output 42 thereof going high each time an arc discharge occurs at the electrode 28. The output 42 of the high voltage circuit 41 is coupled through first and second inverters 86 and 87 to a clock input 88 of a D-type flip-flop 91. The D input 92 of the flip-flop 91 is connected to the voltage supply (not shown) which supplies the operating voltage V for the test set 37. The Q output 93 of the flip-flop 91 is connected to a first input of a NAND gate 96 having a second input connected to the output of NAND gate 52 to receive the 256 pulses per foot of the advance of the wire 11 in the forward direction.

The output of the NAND gate 96 is connected to an input 97 of a probe length preset counter 98. The purpose of the counter 98 is to classify the detected fault as either a pinhole or a bare wire, when an output 101 of the counter 98 goes high each time the length of wire passing through the electrode 28 exceeds the effective length thereof by a predetermined amount.

Each time an arc discharge occurs between the wire 11 and the electrode 28 the output 42 of the high voltage circuit 41 will go high intermittently for the duration of the arc discharge. The initiation of the arc discharge drives the output of the inverter 86 low and causes a positive transition at the input 88 of the flip-flop 91 to switch the output 93 thereof high, thus causing the output of NAND gate 96 to switch at the pulse rate appearing at the output of NAND gate 52. The pulses appearing on the output of NAND gate 96 are registered in the counter 98.

The counter 98 may have the length of the electrode 28 preset therein in a number of ways. The preferred way of presetting the electrode length into the counter 98 is to preload each counting stage therein with a preset number and connect the counter to count down only and detect the zero crossing when the effective length of the electrode has been exceeded by a predetermined amount. The preset electrode length loaded into the counter 98 will actually be the effective length of the electrode 28 plus an arbitrarily determined amount which has been designated to separate a pinhole from a bare wire.

As an example, if the effective length of the electrode 28 is 2½ inches and one-half inch is said to distinguish a pinhole from a bare wire, then the count on the preloaded counter discriminator 98 would be a pulse count equivalent to three inches of length of the wire 11 advanced through the electrode 28. Thus, a count of 64 would be preset into the counter 98, which may comprise a pair of decade counters serially connected and preloaded by a suitable means 99, which may be a plurality of shorting switches connected to the B–C–D inputs thereof to load into the counter 98 a predetermined number. Alternatively, the presetting means 99 may be thumbwheel switches and comparators used to preset the electrode length into the counter 98 which would be connected to count up until the preset number is reached, similar to the footage counter 70. The counter 98, once enabled, continues to count until the footage pulses received thereby are equal to the preset electrode length.

If the fault in the insulation of the wire 11 is a pinhole, when the downcounting counter 98 reaches zero the fault would disappear before a length of wire 11 had passed through the electrode 28 equivalent to the effective length of the probe plus the arbitrarily selected discriminating amount separating a pinhole from a bare wire. However, if the fault is a bare wire, the equivalent length of the wire 11 passed through the electrode 28 would exceed the preset count on the counter 98, and the fault would be present when the count reaches zero. The zero crossing of the counter 98 resets the counter 98 and produces a positive pulse on the output 101 thereof.

To be more precise, since the preferred method is to count down from a preloaded quantity, the counter 98 automatically preloads itself at zero crossing. Assuming that a bare wire is present, the high generated on output 101 of the counter 98 appears at a first input of a NAND gate 102. A second input of the NAND gate 102 is connected to the output of inverter 87, which will be high, generating a low on the output of the NAND gate 102 which is inverted by an inverter 103 coupled to a clock input 106 of D-type flip-flop 107. The positive transition at the input 106 of flip-flop 107 transfers a high from a normally high D input 108 thereof to the Q output 111 thereof, driving a first input of the NOR gate 76 high.

As will be seen from the discussion following, a second input of the NOR gate 76 is normally low and goes high only when an excess number of pinholes have been detected in the insulated wire 11. Thus, the output of the NOR gate 76 goes low when the output 111 of the flip-flop 107 goes high. The low appearing at the output of the NOR gate 76 is coupled to the input 112 of a single-shot 113 which then produces a low on a $\overline{Q}$ output 116 thereof which is connected to a first input of a NAND gate 117, driving its normally low output temporarily high. The output of the NAND gate 117 is connected to a base 118 of a switching transistor 121, having a collector 122 connected to one side of the relay coil 43. The other side of the coil 43 is connected to the terminal 120 connected to a suitable operating voltage source. When the base 118 goes high the transistor 121 conducts, energizing the coil 43 to close a pair of contacts (not shown) in the rewinder control circuit 18 which operates a sequencing circuit in the rewinder control circuit 18 to slow down, stop and reverse the direction of advance of the wire 11 from the take-up reel 13 to the supply reel 12.

When the output 111 of the flip-flop 107 goes high, the high thereon is coupled through an AND gate 126, having first and second inputs tied together to bias a switching transistor 127 into conduction to provide an indication on a bare wire indicator 128 that a bare wire fault has occurred in the wire insulation. Similarly, any fault occurring in the insulation on the wire 11 passing through the electrode 28 produces a high on the output 42 of the high voltage circuit 41. A high thus appears on the output of an AND gate 131 which also has first and second inputs tied together, to bias another switching transistor 132 into conduction to provide an indication that a fault has occurred, on a fault indicator 133.

Each of the fault indicators 128 and 133 may include a lamp serially connected between the collectors of the switching transistors 127 and 132 associated therewith and the source of supply voltage V for the test set 37 or another suitable source. It will be appreciated that the bare wire indicator 128 is operated only when a bare wire occurs, but that the fault indicator 133 is operated whenever a fault of any type occurs.

The output 101 of the counter 98 is also coupled to a first input of a NOR gate 136 and a first input of a NAND gate 137. A second input of the NOR gate 136 is connected to the normally low output of the reset NAND gate 78. Since the output of the counter 88 is normally low, the low inputs at the NOR gate 136 keep the output thereof normally high. Thus when the zero crossing occurs in the counter 98, the output 101 thereof goes high temporarily to drive the output of the NOR gate 136 low to reset the flip-flop 91.

A second input of the NAND gate 137 is coupled to the output of the inverter 86 at the output 42 of the high voltage circuit 41. Since the output of inverter 86 is normally high and goes low only when a fault in the insulation of the wire 11 passes through the electrode 28, the output of the NAND gate 137 is normally high. Thus, the output of an inverter 138 coupled to the NAND gate 137 is normally low. The output of the inverter 138 is coupled to a first input of a NAND gate 140 having its output connected to an "up" input 141 of a pinhole counter 142. A second input of the NAND gate 140 is connected to the output of the excessive fault NOR gate 76, which is normally high and goes low, e.g., when a bare wire is detected. Thus, the output of the NAND gate 140 is normally high.

When a pinhole fault occurs in the insulation of the wire 11 advanced past the electrode 28, the output of the inverter 86 goes low for a brief period but goes high again before the counter 98 reaches zero. When that occurs, the zero crossing output 101 of the counter 98 is gated through the NAND gate 137, inverter 138 and NAND gate 140, and the inverter 138 drives the output of the NAND gate 140 low to trigger the pinhole counter 142, causing it to count up one count.

It should be further understood that if a pinhole is detected, the output of inverter 87 goes low before the counter 98 reaches zero, thus inhibiting the NAND gate 102, holding the output thereof high.

In the case of a bare wire fault, the output of the NOR gate 76 would go low, keeping the output of the NAND gate 140 high, thus inhibiting the pinhole counter 142 from counting up.

Thus, the pinhole counter 142 will count up once when a pinhole is detected and will be inhibited from counting further if a bare wire is detected.

The pinhole counter 142 may be preset by any suitable presetting means 143, for example, thumbwheel switches and comparators associated therewith, such that when the number of pinholes registered in the counter 142 reaches the preset number, a normally high output 146 thereof will be driven low, and a normally low output 147 thereof will be driven high. The preset count may represent the allowable number of pinholes in an entire reel of wire or, alternatively, may represent an allowable number of pinholes in some lesser predetermined length. The lesser predetermined length may be the length which is preset into the footage counter 70, in which case, the output of the inverter 82 may be utilized to reset the pinhole counter 142 to zero each time the footage counter 70 is reset to zero.

The output 146 of the pinhole counter 142 is high as long as the number of registered pinholes in the counter 142 is less than the preset number therein and will go low when the pinhole count is equal to the preset allowable number thereof, which may be one more than the actual allowable number. Similarly, the normally low output 147 of the pinhole counter 142 will remain low until the number of pinholes registered in the counter 142 is equal to the preset allowable number, when it goes high, indicating a major fault, namely, an excess pinhole, in a section of the insulation on the wire 11 advanced past the electrode 28. As mentioned above, a major fault includes an intolerable number of pinholes in a given length of wire.

The normally high output 146 of the counter 142 is connected to the input 108 of the bare wire flip-flop 107. When the pinhole count attains the preset number, the normally low output 147 of the counter 142 goes high, causing the output of NOR gate 76 to go low to indicate the occurrence of a major fault, namely, an excess pinhole.

Thus, any major fault causes the normally high output of the NOR gate 76 to go low. As mentioned above, the occurrence of a major fault triggers the single-shot 113, causing a stepping relay in the rewinder control circuit 18 to slow down, stop and reverse the advance of the wire 11.

If the rewinder control circuit 18 were to be replaced by a major fault indicator similar to the bare wire indicator 128 and the fault indicator 133, the test set 37, as thus far described, could be advantageously utilized on an insulating line, for example, a plastic insulation extruder to indicate that the wire insulation contains a major fault such that the reel upon which the wire is being wound could be marked defective in order to arrange for subsequent transfer to a repair facility such as the rewinder apparatus 10. Since wire insulating lines generally include a continuous high-speed take-up apparatus wherein the wire is wound alternately around successively presented reels, each time the take-up of the wire is transferred from a full to an empty reel, the apparatus could be reset, for example, by closing a master reset switch 156 to reset the flip-flops 51 and 91, the divider 62 and the footage counter 70 through the reset NAND gate 78. Similarly, the output of NAND gate 78 may be utilized to reset the pinhole counter 142 and the flip-flop 107.

In a manner similar to the foregoing, the test set 37 may be utilized in a twisting apparatus to perform a high voltage breakdown test on a pair of insulated wires after they have been twisted together and are being taken up on a reel in a suitable take-up apparatus. The test set 37 may be reset by the master switch 156 each time the take-up reel in the twisting apparatus is replaced by an empty reel.

Additionally, when the output 147 of the pinhole counter 142 goes high, it enables a NAND gate 148, having a first input connected thereto, to go low, when a normally low output 151 of a single-shot 152, the purpose of which will be subsequently explained, goes high since a second input of the NAND gate 148 is connected to the output 151 of the second single-shot 152. When the output of the NAND gate 148 goes low, it causes the pinhole counter 142 to count down one count since the output of the NAND gate 148 is connected to a "down" input 153 of the counter 142. This is because the excessive pinhole counted will be returned to the vicinity of the electrode 28 and repaired before the operation of the rewinder apparatus 10 is continued. Alternately, the pinhole counter 142 may be provided with a switch which could be manually operated to cause a single down count when the fault is repaired.

The outputs 66 and 67 of the divider 62 are connected to up and down inputs 157 and 158, of a fault location counter 161. When the wire 11 is advanced from the supply reel 12 to the take-up reel 13, the output 66 of the divider 62 is producing one pulse for every foot of wire advanced over the measuring sheave 27 and past the electrode 28. Also, at this time, the output 67 of the divider 62 is maintained at a high logic level. The counter 161, however, is inhibited from counting up or down until the normally high output of the NOR gate 76, which is coupled to an enabling input 162 of the counter 161, goes low. This occurs when a major fault, as defined above, appears in the insulation of the wire 11.

As mentioned above, a major fault causes the relay coil 43 to be energized closing a pair of contacts in the rewinder control circuit 18 to slow down, stop and reverse the advance of the wire 11 such that the wire 11 will then begin to counter-advance at a lower speed going from the take-up reel 13 to the supply reel 12. Since the occurrence of a major fault can take place at virtually any section of the wire 11, the time that it takes the mechanism to come to a full stop is irregular. This is simply due to the fact that since the rewinder must be stopped gradually when advancing at a high speed to prevent the wire 11 from breaking, there is little precise control that can be imparted thereto. Thus, when a major fault occurs, the counter 161 is enabled to count up from zero during the time the advance of the wire 11 is slowing down until the advance stops and is automatically reversed. At this time, the count on the counter 161 may be up to 600, indicating that during the irregular time period, the fault detected in the wire 11 can be advanced up to 600 feet past the electrode 28 and, in fact, be wound upon the take-up reel 13.

When the wire 11 is counter-advanced from the take-up reel 13 to the supply reel 12, a phase shift occurs between the outputs 38 and 39 of the encoder 36 with the 512 pulses per revolution on the output 39 leading the 512 pulses per revolution on the output 38. Thus the pulses arriving at the input 58 of the flip-flop 51 lead the pulses arriving at the input 48 thereof. After each positive transition at the input 58, a low appears at the input 48 thereof. Therefore the flip-flop 51 is "reset" during the reverse advance of the wire 11. In the reset condition of flip-flop 51 the output 56 is low and the output 57 is high.

Thus, the output of NAND gate 52 is high, keeping the output of the NAND gate 96 from going high, thus inhibiting the counter 98 when the direction of advance of the insulated wire 11 is reversed. The output of the NAND gate 53, however, switches at the pulse rate output of the wave shaper 46. It can be seen that while the counter 98 is inhibited, no faults will be registered.

During the reverse advance of the insulated wire 11, 256 pulses for each foot of the wire 11 being counter-advanced appear on the output 67 of the divider 62, pulsing the down input 158 of the counter 161 such that the counter 161 begins to count down from the count registered thereon, which represents the length of wire 11 which has been advanced past the electrode 28 since the fault was detected and represents the distance which the fault must travel in reverse to return to the point at which it was detected, namely, the electrode 28. The line speed of the apparatus 10 in reverse is slower than the forward speed and may be 1,200 feet per minute.

When the count or the counter 161 reaches zero, a normally high output 163 thereof goes low to trigger the second single-shot 152, causing the output 151 thereof to go high and causing an output 164 thereof to go low. When the output 164 of the single-shot 152 goes low, it causes the normally low output of the NAND gate 117 to go high, again biasing the switching transistor 121 into conduction and causing the relay coil 43 to be energized a second time.

The second operation of the relay coil 43 closes the contacts in the rewinder control circuit 18 a second time to operate the sequencing circuit to impart an emergency stop to the apparatus 10 such that the apparatus 10 halts the counter-advance of the wire 11 within five feet. Thus, the fault in the insulation of the wire 11 may be returned when it has counter-advanced five feet past the electrode 28 in the reverse direction. If it is desired to stop the fault at the electrode 28, the counter 161 may be preloaded such that its output 163 will go low when the count reaches five feet. Similarly, if desired, the counter 161 may be set to produce a low when any preset number, more or less than five feet, is preloaded into the counter 161. For example, the output 163 may go low when the count on counter 161 reaches 3 feet, 2 feet or 1 foot. Thus, the major fault may be returned to a precisely located position with respect to the electrode 28 in order to facilitate repair or removal.

It can be seen that the encoder 36 provides an asynchronous clocking source for the test set 37, making the system independent of line speed since it is the length of wire being advanced which determines the operation of the system. Thus, the apparatus may be run at fluctuating speeds without impairing the operation thereof. Moreover, there is no possibility of missing a fault or stopping at other than the offending fault, since the counter 98 is inhibited in the reverse direction of advance of the wire 11.

Additionally, the bare wire flip-flop 107 may be reset by the manual closure of a bare wire reset switch 166 each time a major fault is located and repaired by an operator.

It is believed that the operation of the above described method and apparatus will be apparent from the foregoing description. While the method and apparatus of the invention have been described as being suitable for use on wire insulating lines, wire twisting apparatus, and wire repair facilities, it will be obvious to those having ordinary skill in the art that the method and apparatus of the invention may be used in various other types of apparatuses, for example, in testing a cable jacket having a metallic sheath thereunder, and that various changes and modifications may be made therein without departing from the spirit and scope of the invention.

What is claimed is:

1. A method of detecting and classifying major and minor insulation faults in an insulated elongated conductor advancing longitudinally past an electrode, wherein a sufficient electrical potential is provided between the conductor and the electrode to cause an arc discharge therebetween at an insulation fault on the conductor which comprises the steps of:

detecting an arc discharge occurring when a fault is adjacent to the electrode;

generating a quantity proportional to the length of conductor advanced past the electrode since the initiation of the arc discharge;

diminishing a fixed quantity, proportional to the effective length of the electrode traversed by the conductor, by an amount equal to the generated quantity;

identifying the fault as major if the arc discharge has not terminated when the generated quantity diminishes the fixed quantity to zero; and identifying the fault as minor if the arc discharge has terminated when the generated quantity diminishes the fixed quantity to zero.

2. A method of detecting and classifying major and minor insulation faults, as set forth in claim 1, wherein the generated quantity is a series of pulses, each of which represents an equal increment of the length of the conductor advancing past the electrode at a pulse rate determined by the speed of the advancing conductor and the fixed quantity is a pulse count representing the total number of such increments equal to the effective length of the electrode, which is diminished by counting down therefrom at the generated pulse rate from the time the arc discharge is initiated.

3. A method of detecting and classifying major and minor insulation faults in an insulated elongated conductor advancing longitudinally past an electrode, wherein a sufficient electrical potential is provided between the conductor and the electrode, to cause an arc discharge therebetween at an insulation fault on the conductor, which comprises the steps of:
- detecting an arc discharge occurring when a fault is advanced adjacent to the electrode;
- generating a quantity proportional to the length of conductor advanced past the electrode from the time the arc discharge is initiated;
- identifying the fault as minor if the arc discharge has not ceased when the generated quantity attains a value equal to a fixed quantity proportional to the effective length of the electrode traversed by the conductor; and
- identifying the fault as major if the arc discharge has ceased when the generated quantity attains said value.

4. A method of detecting and classifying major and minor insulation faults, as set forth in claim 3, wherein the generated quantity is a series of pulses, each of which represents an equal increment of the length of the conductor advancing past the electrode at a pulse rate determined by the speed of the advancing conductor and the fixed quantity is a pulse count, representing the total number of such increments equal to the effective length of the electrode which is attained by counting up thereto at the generated pulse rate from the time the arc discharge is initiated.

5. A method of locating insulating faults in an insulated elongated conductor which comprises the steps of:
- advancing the conductor longitudinally through a sensing region;
- detecting a fault in the conductor section within the region;
- terminating the advance of the conductor over an irregular time period following the detection of the fault;
- generating a quantity directly related to the length of the conductor which has advanced through the region over the time period;
- counter-advancing the conductor through the region;
- diminishing the generated quantity by an amount directly related to the length of conductor counter-advanced through the region; and
- terminating the counter-advance of the conductor when the quantity has diminished to a predetermined value to place the conductor section which was within the region at the time the fault was detected within a predetermined longitudinal distance from the region.

6. A method of locating insulation faults in insulated elongated conductors, as set forth in claim 5, wherein the generated quantity is the total of a series of pulses, each of which represents an equal increment of the length of the conductor advanced through the sensing region during the irregular time period at a pulse rate determined by the speed of the advancing conductor and which is diminished by counting down increments at a pulse rate determined by the speed of the counter-advancing conductor.

7. A method of detecting and identifying insulation faults in an insulated elongated conductor advancing longitudinally past an electrode, wherein a sufficient electrical potential is provided between the conductor and the electrode to cause an arc discharge therebetween at an insulation fault on the conductor, which comprises the steps of:
- generating a series of pulses, each representative of an equal increment of the length of the conductor advanced past the electrode at a pulse rate determined by the speed of the advancing conductor;
- detecting an arc discharge occurring when a fault is adjacent to the electrode;
- counting a predetermined number of the generated pulses, representative of the effective length of the electrode traversed by the conductor, at the generated pulse rate from the initiation of the arc discharge;
- registering the detected fault if the arc discharge has terminated when the predetermined number of generated pulses are counted;
- identifying the detected fault as major if the arc discharge has not terminated when the predetermined number of generated pulses are counted;
- counting the number of register faults; and
- identifying the last registered fault as major if the total number of registered faults is equal to a predetermined number.

8. A method of locating major insulation faults detected and identified by the method of claim 7, comprising the steps of:
- dividing the generated pulses to obtain one pulse per unit length of the conductor advancing past the electrode;
- terminating the advance of the conductor over an irregular time period following the identification of a major fault;
- registering the total number of divided pulses generated during the irregular time period;
- counter-advancing the conductor past the electrode;
- generating a series of pulses each representing a unit length of the conductor counter-advancing past the electrode at a pulse rate determined by the speed of the counter-advancing conductor;
- diminishing the registered number of divided pulses at the pulse rate of the counter-advancing conductor; and
- terminating the counter-advance of the conductor when the registered number has diminished to a predetermined value, to place the conductor section adjacent to the electrode at the time the arc discharge was detected within a predetermined longitudinal distance from the electrode.

9. An apparatus for classifying major and minor insulation faults in an insulated elongated conductor advancing longitudinally past an electrode, and including means for providing a sufficient electrical potential between the conductor and the electrode to cause an arc discharge therebetween at an insulation fault on the conductor and means for detecting an arc discharge occurring when a fault is adjacent to the electrode, which comprises:
- means for generating a quantity proportional to the length of conductor advanced past the electrode since the initiation of the arc discharge;

means for establishing a fixed quantity proportional to the effective length of the electrode traversed by the conductor;

means for diminishing the fixed quantity by an amount equal to the generated quantity;

means for identifying the fault as major if the arc discharge has not terminated when the generated quantity diminishes the fixed quantity to zero; and means for identifying the fault as minor if the arc discharge has terminated when the generated quantity diminishes the fixed quantity to zero.

10. An apparatus for detecting and classifying major and minor insulation faults in an insulated elongated conductor as recited in claim 9 wherein:

said generating means includes a pulse generator for generating a fixed number of pulses per unit length of the conductor advancing past the electrode;

said means for establishing the fixed quantity includes a counter for generating an output signal when its count is zero and means for preloading the fixed quantity as a fixed count registered in said counter;

said means for diminishing the fixed quantity includes first gating means coupled to said counter for impressing the output of said pulse generator on said counter when the arc discharge is initiated to diminish the fixed count to zero at the generated pulse rate;

said major fault identifying means includes second gating means operable in response to the output signal of said counter during the arc discharge; and said minor fault identifying means includes third gating means operable in response to the output signal of said counter in the absence of an arc discharge.

11. An apparatus for detecting and classifying major and minor insulation faults in an insulated elongated conductor advancing longitudinally past an electrode, including means for providing a sufficient electrical potential between the conductor and the electrode to cause an arc discharge therebetween at an insulation fault on the conductor and means for detecting an arc discharge occurring when a fault is advanced adjacent to the electrode, which comprises:

means for generating a quantity proportional to the length of conductor advanced past the electrode from the time the arc discharge is initiated;

means for establishing a fixed quantity proportional to the effective length of the electrode traversed by the conductor;

means for comparing the generated quantity to the fixed quantity;

means for identifying the fault as minor if the arc discharge has ceased when the generated quantity is equal to the fixed quantity; and means for identifying the fault as major if the arc discharge has not ceased when the generated quantity is equal to the fixed quantity.

12. An apparatus for detecting and classifying major and minor insulation faults in an insulated elongated conductor, as recited in claim 11, wherein:

said generating means includes a pulse generator for generating a fixed number of pulses per unit length of the conductor advancing past the electrode;

said means for establishing the fixed quantity includes a counter and means for presetting said counter with the fixed quantity as an achievable count therein, to cause an output signal from said counter when said preset count is achieved;

said comparing includes first gating means coupled to said counter for impressing the output of said pulse generator on said counter when said arc discharge is initiated to count up to the preset count;

said major fault identifying means includes second gating means operable in response to an output signal from said counter during the arc discharge; and said minor fault identifying means includes third gating means operable in response to an output from said counter in the absence of an arc discharge.

13. An apparatus for locating insulation faults in insulated elongated conductors which comprises:

means for advancing the conductor longitudinally through a sensing region:

means for detecting a fault in the conductor section within the region;

means for terminating the advance of the conductor over an irregular time period following the detection of the fault;

means for generating directly related to the length of the conductor which has advanced through the region over the time period;

means for counter-advancing the conductor through the region;

means for diminishing the generated quantity by an amount directly related to the length of conductor counter-advanced through the region; and means for terminating the counter-advance of the conductor when the quantity has diminished to a predetermined amount to place the conductor section which was within the region at the time the fault was detected within a predetermined longitudinal distance from the region.

14. An apparatus for locating insulation faults in an insulated elongated conductor, as recited in claim 13 and including a pulse storage counter having a first input for receiving pulses to cause said counter to count up, a second input for receiving pulses to cause said counter to count down, an output operable in a down counting mode when the stored count has achieved a predetermined count, and means for enabling said counter when a fault is detected, and wherein:

said generating means includes first pulse generating means for generating one pulse per unit length of the elongated conductor advancing through the sensing region and means for coupling said first pulse generating means to the first input of said counter;

said generated quantity is the number of pulses stored in said pulse counter over the irregular time period;

said predetermined value is the predetermined count;

said quantity diminishing means includes second pulse generating means for generating one pulse per unit length of the elongated conductor counter-advancing through the sensing region and means for coupling said second pulse generating means to the second input of said pulse counter; and said means for terminating the counter-advance of the conductor includes a control means responsive to the output of said pulse counter for stopping the counter-advance of the conductor and means coupling the output of said pulse counter to said control means.

15. An apparatus for detecting, identifying and locating major insulation faults in an insulated elongated conductor advancing longitudinally past an electrode, wherein a sufficient electrical potential is provided between the conductor and the electrode to cause an arc discharge therebetween at an insulation fault on the conductor, which comprises:

first pulse generating means for generating a fixed number of pulses per unit length of the conductor advancing past the electrode at a pulse rate determined by the speed of the advancing conductor;

means for detecting an arc discharge occurring when a fault is adjacent to the electrode;

a first pulse counter;

preset means for adapting said first counter to count a predetermined pulse total equivalent to the effective length of the electrode in terms of said fixed number of pulses per unit length thereof and to render an output signal when the predetermined pulse total is achieved;

means for coupling said first pulse generating means to said first counter;

means responsive to the detection of the arc discharge for enabling said first counter to count said generated pulses;

a second pulse counter;

means for presetting said second pulse counter to render an output signal when a preset count has been achieved therein;

means responsive to the output signal of said first counter to cause said second counter to register a count if the arc discharge has terminated when the predetermined pulse total in said first counter has been received;

means responsive to the output signal of said first counter for identifying a major fault if the arc discharge has not terminated when the predetermined pulse total in said first counter has been received;

means responsive to an output signal from said second counter for identifying a major fault when the registered count equals the preset count therein;

a third pulse counter having first and second pulse receiving inputs for counting up and down, respectively and an output;

means for presetting said third counter to render an output signal when a predetermined count is reached in a down-counting mode;

means coupling said first pulse generating means to said first input of said third counter;

means responsive to the identification of a major fault for terminating the advance of the conductor over an irregular time period and reversing the advance of the conductor, and for enabling said third counter;

second pulse generating means for generating a fixed number of pulses per unit length of the conductor advancing in reverse past the electrode;

means for coupling said second pulse generating means to said second input of said third counter;

means for disabling said first pulse generating means when the conductor is advancing in reverse; and means responsive to the output signal of said third counter for terminating the reverse advance of the conductor to place the major fault identified within a predetermined longitudinal distance from the electrode.

\* \* \* \* \*

UNITED STATES PATENT OFFICE
CERTIFICATE OF CORRECTION

Patent No. 3,789,295       Dated January 29, 1974

Inventor(s) WILLIAM CLEMENT BALCHUNAS and JOSE ANTONIO MILA

It is certified that error appears in the above-identified patent and that said Letters Patent are hereby corrected as shown below:

In the specification, Column 2, line 55 "Arnold" should read --Arnold--. Column 3, line 45 "on" should read --or--. Column 7, line 37 "Q" should read --"Q"--.
Column 10, line 10 "Q" should read --"Q"--; line 50 "88" should read --98--. Column 12, line 48 "up and down" should read --"up" and "down"--. Column 15, line 15 "minor" should read --major--; line 20 "major" should read --minor--. Column 16, line 26 "register" should read --registered--. Column 18, line 3 following "comparing" insert --means--; line 22 following "generating" insert --a quantity--.

Signed and Sealed this fourth Day of November 1975

[SEAL]

Attest:

RUTH C. MASON
*Attesting Officer*

C. MARSHALL DANN
*Commissioner of Patents and Trademarks*